Nov. 4, 1930.    H. G. HOLMES    1,780,782

RELIEF VALVE

Filed June 4, 1928

INVENTOR
Herbert G. Holmes
BY Chappell & Earl
ATTORNEYS

Patented Nov. 4, 1930

1,780,782

UNITED STATES PATENT OFFICE

HERBERT G. HOLMES, OF LANSING, MICHIGAN, ASSIGNOR TO NOVO ENGINE COMPANY, OF LANSING, MICHIGAN

RELIEF VALVE

Application filed June 4, 1928. Serial No. 282,714.

The objects of the invention are:

First, to provide a relief valve that is positive in operation and very quick acting and which also operates at a high, low or intermediate pressure.

Second, to provide a relief valve that reduces the operating expense, the engine running under no load when the water is being discharged through the relief valve.

Third, to provide means whereby the pressure can be regulated as desired.

Further objects and objects pertaining to details and economies of construction and operation will definitely appear from the description to follow.

I accomplish the objects of my invention by the devices and means described in the following specification. The invention is clearly defined and pointed out in the claims.

A device embodying my invention is clearly illustrated in the accompanying drawing forming a part of this specification, in which.

Figure 1:
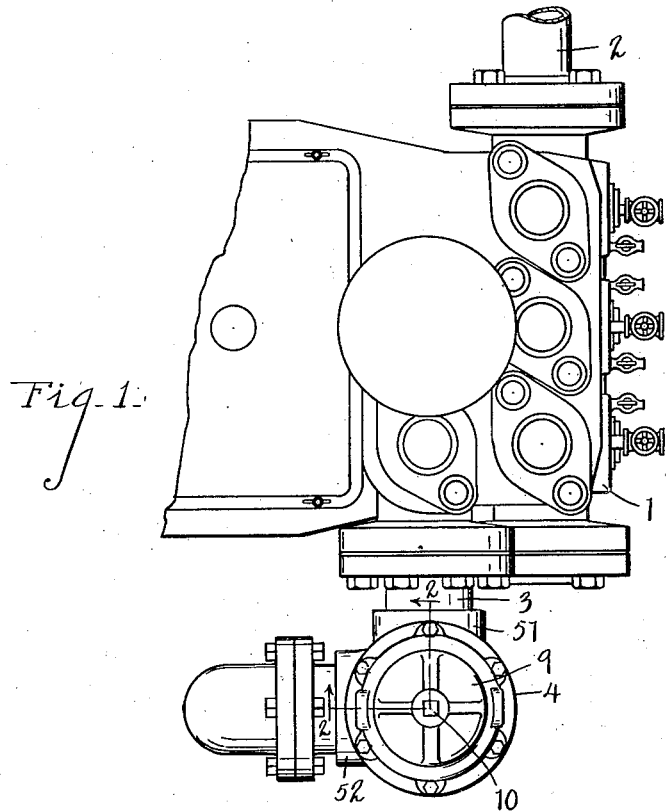
Fig. 1 is a partial plan view of the pump with my improved relief valve attached thereto.
Figure 3:
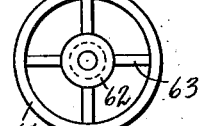
Fig. 3 is a plan view of the removable valve seat.
Figure 2:
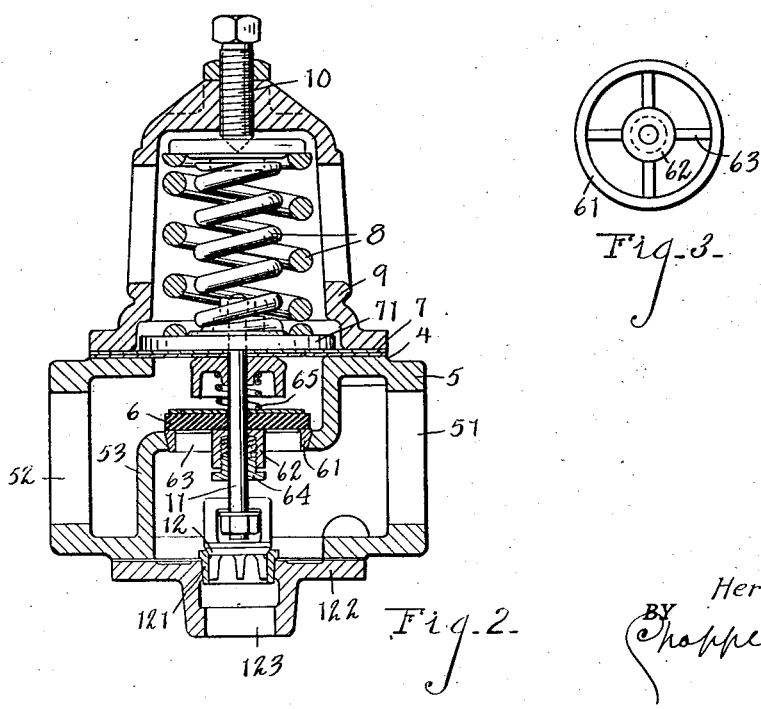
Fig. 2 is a vertical section through the relief valve taken on line 2—2 of Fig. 1, parts being shown in full lines.

The parts will be identified by their numerals of reference which are the same in all views.

1 is the water pump of the usual construction. 2 is the inlet connection thereto. 3 is the outlet connection. 4 is my improved relief valve which is composed of a central body 5 having inlet 51 from the pump. 52 is the discharge to the pipe line. 53 is the main valve seat supporting partition.

6 is the main check valve of rubber or suitable material. 61 is the removable valve seat having hub portion 62 centrally supported by the spider 63. A stuffing box 64 is provided therein. 65 is a coil spring holding the main check valve yieldingly against the seat by contact with the wear plate thereof. 7 is the fabric inserted rubber diaphragm. 71 is the diaphragm supporting head. 8 is a plurality of pressure regulating springs. 9 is the housing therefor. 10 is an adjusting screw for said springs 8. 11 is a downwardly projecting valve stem. 12 is the relief valve loosely and flexibly connected thereto. 121 is the seat for the relief valve. 122 is a valve plate for the relief valve, and 123 is the discharge port therefrom.

With the parts thus arranged, I have constructed a pressure relief valve that is positive and quick in action, thereby assuring a material reduction in the cost of maintenance and operation. It is usually the practice to reduce the speed of the engine to maintain a constant pressure in the pipe line. With the device of the construction illustrated and described, the pressure in the pipe line is regulated by the check valve 6 which is of rubber or other suitable material, insuring positive action and contact with the removable valve seat 61. As the water is discharged from the pump it enters the intake 51 of the valve body 5. It is then passed by the valve 6 and into the pipe line at 52 to the discharge end. This valve is of great importance to road builders, as the discharge end is often miles away from the pump.

When the discharge is periodically cut off, such being the case in concrete road paving, water is used for about forty seconds during the wetting of each batch of concrete and then shut off until the next batch is ready. A back pressure is produced upon the diaphragm 7 which is regulated by the springs 8. This pressure, being greater than the tension of the springs, raises the diaphragm 7 and opens the relief valve lid 12. This drops the pressure in the intake 51. The valve 6 then automatically closes and allows the water from the pump to be discharged through the outlet 123, thereby unloading the back pressure on the pump and thus relieving the machinery and saving power.

Having thus described my invention, what I claim as new and desire to secure by Letters Patent is:

1. A relief valve structure for connection to the discharge of a power pump comprising a body portion, with a main check valve structure comprising a seat with a hub at its center provided with a stuffing box and a main valve disk, with a spring for holding the same in closed position, a relief valve at one side of the main body axially in line with the center of said check valve, a stem for said relief valve disposed through the said stuffing box, a diaphragm for the said relief valve, a head on the said stem to coact with the diaphragm, and adjustable springs for holding the said head yieldingly downward to seat the said relief valve, whereby the pump in normal operation will open the main check valve, and whereby abnormal back pressure will react upon the diaphragm and open the relief valve and permit the main check valve to seat, as specified.

2. A relief valve structure for connection to the discharge of a power pump comprising a body portion, with a main check valve structure comprising a seat with a hub at its center provided with a stuffing box and a main valve disk, with a spring for holding the same in closed position, a relief valve at one side of the main body axially in line with the center of said check valve, a stem for said relief valve disposed through the said stuffing box, a diaphragm for the said relief valve, a head on the said stem to coact with the diaphragm, and springs for holding the said head yieldingly downward to seat the said relief valve, whereby the pump in normal operation will open the main check valve, and whereby abnormal back pressure will react upon the diaphragm and open the relief valve and permit the main check valve to seat, as specified.

3. A relief valve structure comprising a main check valve casing with a central opening, a valve seat with a spider supporting a central hub and a valve disk adapted to said seat with a spring for holding the same in position, a relief valve axially in line with the main check valve, the valve stem extending through the said main check valve, a diaphragm connection to the relief valve stem, and means to hold the same yieldingly to its seat whereby the reaction of back pressure will open the relief valve and permit the main check valve to seat.

4. A relief valve structure comprising a main check valve casing with a central opening, a valve seat with a spider supporting a central hub and a valve disk adapted to said seat, a relief valve axially in line with the main check valve, the valve stem extending through the said main valve, a diaphragm connection to the relief valve stem, and means to hold the same yieldingly to its seat whereby the reaction of back pressure will open the relief valve and permit the main check valve to seat.

In witness whereof I have hereunto set my hand.

HERBERT G. HOLMES.